Jan. 23, 1945. W. E. STITZ ET AL 2,367,697
ENGINE MOUNT
Filed Jan. 23, 1943 2 Sheets-Sheet 1

INVENTORS
WILBUR E. STITZ
DWIGHT C. KENNARD
ATTORNEYS

Jan. 23, 1945.  W. E. STITZ ET AL  2,367,697
ENGINE MOUNT
Filed Jan. 23, 1943   2 Sheets-Sheet 2

INVENTORS
WILBUR E. STITZ
DWIGHT C. KENNARD
ATTORNEYS

Patented Jan. 23, 1945

2,367,697

UNITED STATES PATENT OFFICE 2,367,697

ENGINE MOUNT

Wilbur E. Stitz and Dwight C. Kennard,
Dayton, Ohio

Application January 23, 1943, Serial No. 473,298

10 Claims. (Cl. 248—5)

(Granted under the act of March 3, 1883, as
amended April 30, 1928; 370 O. G. 757)

The invention described herein may be manufactured and used by or for the Government for governmental purposes, without the payment to us of any royalty thereon.

This invention relates to engine mountings, and more particularly, to flexible mounting means for the absorption of vibratory reactions caused by an engine in motion.

Reciprocating engines, in general, produce alternating impulses or vibrations due to gas pressure forces, inertia reactions of reciprocating parts, unbalance of rotating parts, and vibratory reactions associated with crankshaft and crankcase flexibility. Vibrations emanating from these sources exist in various degrees of severity, depending upon the particular design and installation of the engine. In the earlier years of application of internal combustion power plants in the automotive and aviation industries, power outputs were small and alternating forces, producing vibration, were relatively small under normal conditions. Vibration in the earlier installations was apparent, but was considered, for the most part, as an inherent evil of reciprocating engines. As power output increased, vibration became more severe, often causing structural fatigue, failures, and excessive operator or pilot fatigue. It was then apparent that means for isolating such vibrations from the supporting structure must be developed.

Rubber presented the most practical means of cushioning power plant supports because of its resiliency, elasticity, and reasonableness in size and weight. One of the means developed for mounting radial aircraft engines consists of rubber bushings which are still in use on older types of airplanes. These bushings, however, are not considered successful today, since they do not provide linear elasticity. More recently, methods have been developed for mounting power plants so that the shear properties of the rubber produced the required elasticity in such a way as to provide an effective center of gravity suspension. Such methods are, in general, satisfactory and are in use on many of the more recent power plant installations. However, these installations entail considerable weight, size, uneconomical fabrication and mechanical complications.

An aim of the present invention is to provide a mounting which will allow an engine a sufficient limited amount of desirable motion in response to its impulses and other movements to avoid structural fatigue, such as will result from a dead or solid mounting.

Another object of the invention is to provide means for cushioning or damping engine motions to avoid a transmission of its oscillatory and vibratory reactions beyond the engine mounting or, in other words, into the base or frame on which the engine is mounted.

A further purpose of the invention is to provide means for mounting internal combustion engines, which involve a minimum number of parts, compactness, simplified construction, and which, at the same time, embodies the desirable features of flexible engine mounts that employ rubber or similar material in shear.

These and other objects of the invention will become apparent from the following detailed description and appended claims when considered in connection with the accompanying drawings, illustrative of a practical embodiment having the characters of our invention and by which the same may be practiced, in which—

Figures 1, 2:
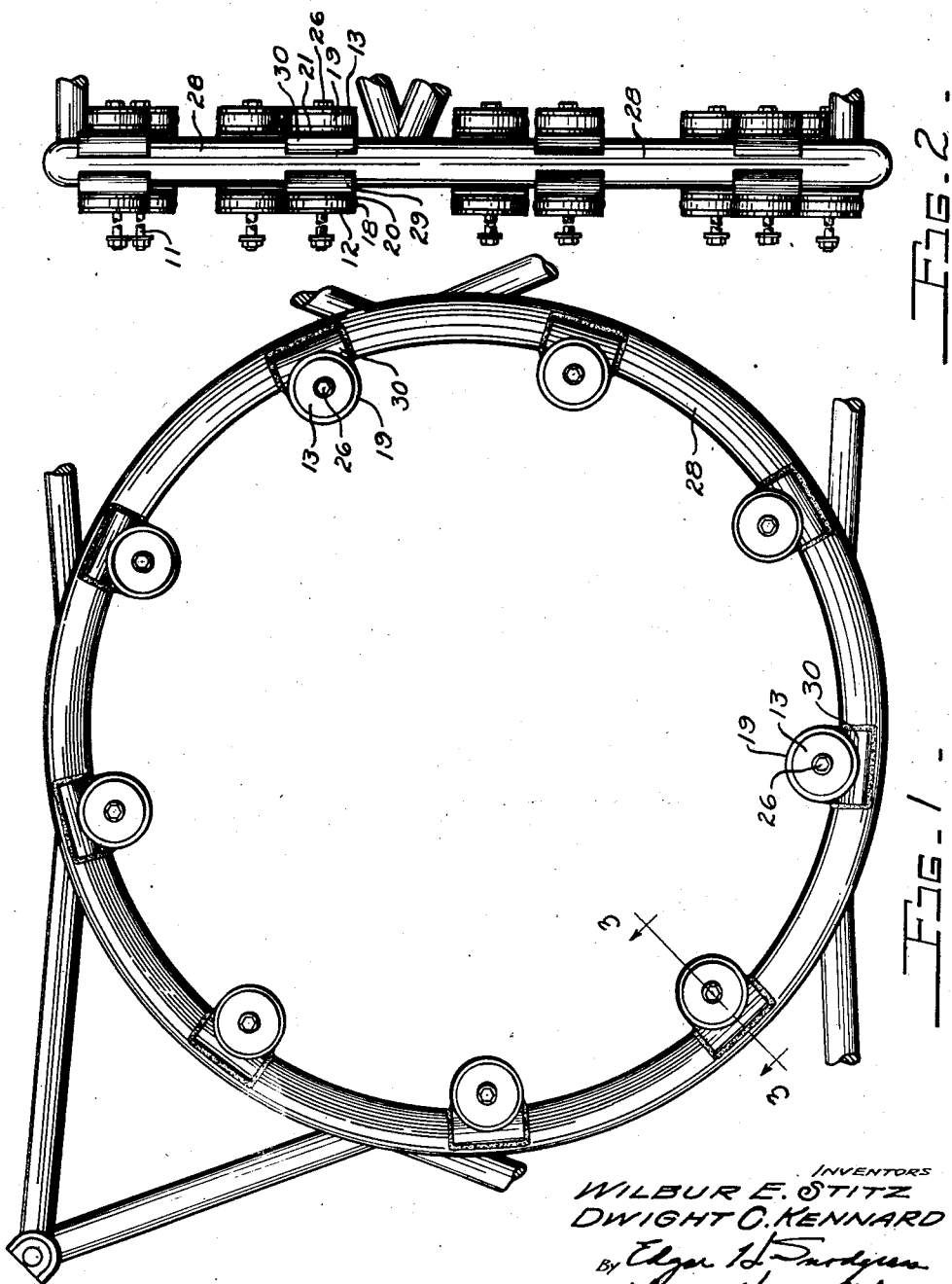
Figure 1 is a plan view of a preferred embodiment of our improved engine mounting means.
Figure 2, is a view inside elevation of the Figure 1 embodiments.
Figure 3:
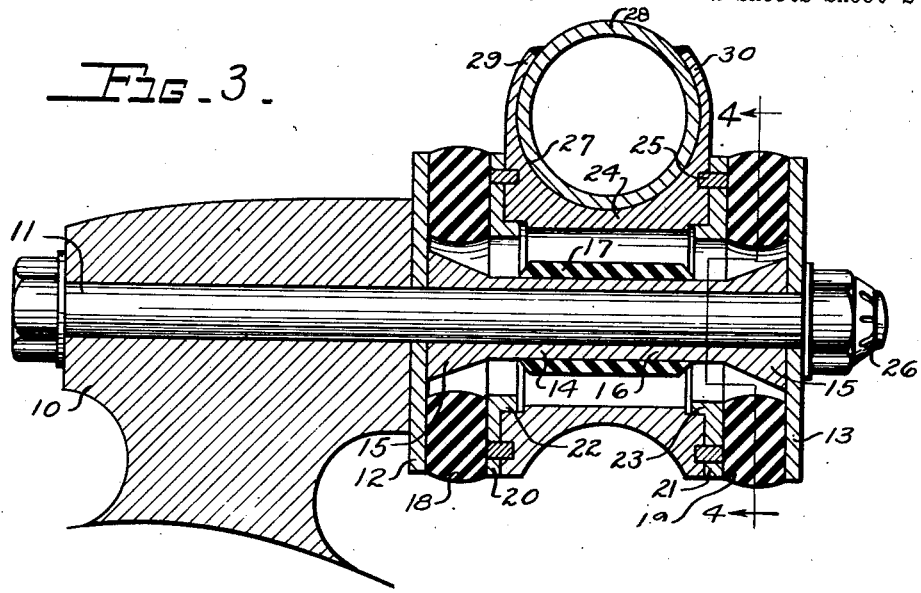
Figure 4:
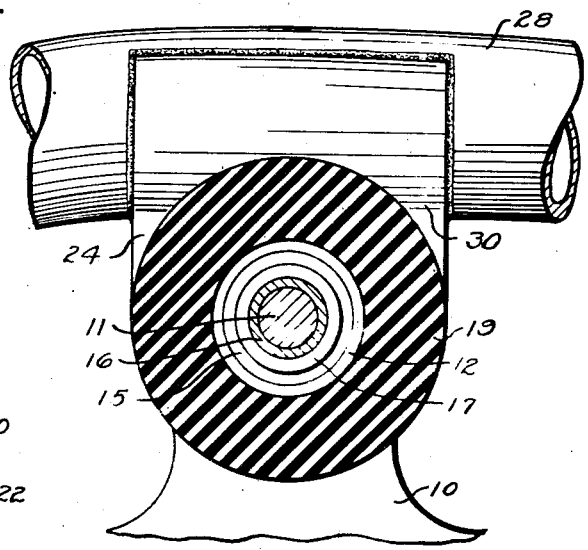
Figure 5:
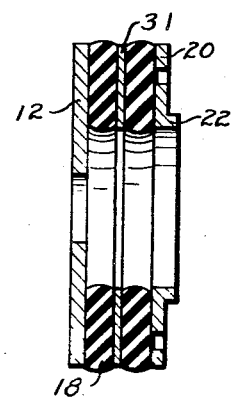

Figure 3, an enlarged detailed view in cross section, taken as at line 3—3 of Figure 1;

Figure 4, a view partially in cross section, taken as at line 4—4 of Figure 3; and Figure 5, an elevational view of a modified form of the ring-like cushioning means employed in the embodiments of Figures 1 through 4.

The assembly shown, particularly in Figure 3, includes a plurality of engine mounts 10, which are customarily rigidly attached to the engine support. Each engine mount 10 is drilled to accommodate an assembly bolt 11 upon which the improved assembly is mounted. Each unit of the assembly illustrated includes a pair of metal washers 12 and 13 supported on the assembly bolt 11 and between the metallic washers 12 and 13 there is interposed a metallic sleeve or spool 14 having enlarged end portions 15 to provide a reduced central portion 16 upon which is mounted a rubber sleeve or cushion 17. Also interposed between the metallic washers 12 and 13 there is provided a pair of cushioning rings 18 and 19 of rubber or other resilient material. These cushioning rings are provided with an interior diameter in excess of the outer diameter of the spool 14 which they surround, when assembled, and are mounted co-axially to provide for their suspension free of contact with the spool under normal conditions. The cushioning rings 18 and 19 are preferably bonded to the metallic washers 12 and 13. On the inner face of each of the cushioning rings 18 and 19 there is provided a flanged washer 20 and 21, respectively, which are bonded to the respective cushioning rings. The flanges 22 and 23 of the washers 20 and 21 are co-axial with the opening through the respective flanged washers, and the diameter of the opening through the flanged washers are comparable with the diameter of the cushioning rings 18 and 19.

Between the flanged washers, there is provided a mounting ring 24 mounted coaxially with the assembly bolt 11. The opening through the mounting ring 24, however, is of a diameter sufficiently greater than the diameter through the flanged washers 20 and 21 as will permit the mounting ring to fit upon the outer surfaces of the flanges of the flanged washers 20 and 21 in order to retain, under normal conditions, the co-axial relationship of the various parts. The mounting ring may also be keyed or otherwise secured to the flanged washers, such as by studs 25, prior to the bonding of the flanged washers to the cushioning rings 18 and 19. The elements of the assembly are secured in compact co-axial relationship upon the assembly bolt 11 by means of the usual nut 26.

The mounting ring 24 is provided with a channel 27 on its outer face, as mounted in the assembly shown particularly in Figure 1, which channel is adapted to receive and cooperatively engage a master mounting ring 28 extending from one mounting assembly to another. The edges or lips 29 and 30 forming the channel in the mounting ring 24 are bent inwardly into engaging relationship, as shown in Figure 1, with the master mounting ring 28 for securement therewith.

The openings through the washers 12, 13, 20 and 21, and the cushioning rings 18 and 19 may be located eccentrically with respect to the center of the assembly bolt 11 and the spool 14 by offsetting flanges 22 and 23 or the studs 25. This will allow deflections due to initial service loads such as engine torque reactions. Furthermore, the cushioning rings 18 and 19, rather than being of one integral body as shown in Figure 3, may be formed as shown in Figure 5, wherein it will be seen that a metallic washer 31 having an interior diameter comparable with that of the flanged washer may be positioned centrally of the cushioning ring and bonded thereto in order to provide metallic reinforcement.

The assembly allows relative motion between the engine frame of which lug 10 is a part, and the chassis or fuselage of which the mounting ring 24 is a part. Relative motion perpendicular to the axis of the assembly bolt 11 is provided principally by stressing the cushioning rings 18 and 19 in shear. Relative motion along the axis of the assembly bolt 11 is provided principally by stressing the cushioning rings in tension and compression.

Washers 12, 13, 20 and 21, and the cushioning rings 18 and 19 may be circular or elliptical in shape, according to the relative directional stiffness required by the particular design.

Stiffness of the rubber elements is chosen to provide natural frequencies of the mounted power plant mass in all modes of motion sufficiently below the frequencies of principal vibratory forces and couples generated by the power plant, thus limiting the transmission of these forces and couples into the chassis or fuselage.

It will thus be seen that the improved assembly comprises flexible and elastic cushioning rings which are bonded to metallic washers located on each side of the engine mounting ring. The inner washers are locked in place to the mounting ring by suitable means, while the outer washers are locked to the engine attaching assembly bolt. Thus relative motion between the engine frame and the mounting ring is restricted to relative motion between the inner and outer washers of the mounting unit. Consequently, the relative motion is provided by deformation of the cushioning rings which provide for a slight universal motion by subjecting the cushioning rings to compressional, tensional and shearing stresses.

Having described our invention, and illustrated an embodiment by which the same may be practiced, we claim:

1. In combination with a fixed mounting frame of a vehicle or structure and a fixed mounting lug of an engine housing, a resilient shock and vibration absorbing coupling connecting said frame and lug and allowing a slight universal motion and displacement of the engine with respect to said frame, said coupling including an assembly bolt carried by said lug and extending therefrom, a pair of substantially flat sided resilient ring-like members mounted in radially and axially air spaced relation to the extending portion of said assembly bolt, and bushing means surrounding said extending portion and disposed intermediate said resilient members, said bushing means being secured to said frame and to the inwardly disposed flat sides of said resilient members, and rigid means radially stationary relative said bolt secured to the outwardly disposed flat sides of said resilient members whereby stresses normal to the axis of said bolt stress said resilient members in shear and axial stresses in said bolt stress one of said resilient members in compression.

2. A resilient flexible engine mount adapted to be interposed between a lug of an engine housing and a frame upon which the engine is to be mounted to allow the engine slight universal motion in response to its impulses and motions and to eliminate transmission of shocks and vibratory reactions into said frame, said mount including an assembly bolt adapted to engage said lug, a pair of washers upon said bolt, sleeve-like spacer means upon said bolt holding said washers in spaced relation, a pair of resilient cushioning rings carried by said washers and having an inner diameter sufficiently in excess of the overall diameter of said spacer and assembly bolt as will permit distortion of said rings, and frame coupling means secured to said cushioning rings in spaced relation to said washers, spacer and assembly bolt.

3. A resilient flexible engine mount adapted to be interposed between a lug of an engine housing and a frame upon which the engine is to be mounted to allow the engine slight universal motion in response to its impulses and motions and to eliminate transmission of shocks and vibratory reactions into said frame, said mount including an assembly bolt adapted to engage said lug, a pair of washers upon said bolt, sleeve-like spacer means upon said bolt holding said washers in spaced relation, a pair of resilient cushioning rings carried by said washers and having an inner diameter sufficiently in excess of the overall diameter of said spacer and assembly bolt as will permit distortion of said rings, frame coupling means secured to said cushioning rings in spaced relation to said washers, spacer and assembly bolt, and resilient means carried by said spacer in spaced relation to said frame coupling means adapted to serve as a cushioning bumper for said frame coupling means in the event of extreme distortion of said cushioning rings in response to said engine motions.

4. A resilient flexible engine mount adapted to be interposed between a lug of an engine housing and a frame upon which the engine is to be mounted to allow the engine slight universal motion in response to its impulses and motions and to eliminate transmission of shocks and vibratory reactions into said frame, said mount including an assembly bolt adapted to engage said lug, a pair of washers upon said bolt, sleeve-like spacer means upon said bolt holding said washers in spaced relation, a pair of resilient cushioning rings having one face of each thereof secured to the inner opposed faces of said washers and having an inner diameter sufficiently in excess of the overall diameter of said spacer and assembly bolt as will permit distortion of the rings shearwise, compressionally and tensionally, frame coupling means secured to the other faces of said cushioning means in spaced relation to said washers, spacer and assembly bolt, and resilient means carried by said spacer in spaced relation to said frame coupling means adapted to serve as a cushioning bumper for said frame coupling means in the event of extreme shearwise distortion of said cushioning rings in response to engine motions.

5. Resilient means for connecting an engine to an engine support comprising a bushing, a bolt portion extending therethrough, said bolt being adapted to be secured to an engine lug, and spaced resilient units disposed at opposite ends of said bushing and connecting said bolt portion and bushing, each of said units including an end plate rigidly engaged with an end of said bushing, a second end plate rigidly carried by said bolt portion, and a pad of resilient material disposed between and bonded to said end plates.

6. Resilient means for connecting an engine to an engine support comprising a bushing, a bolt portion extending therethrough, said bolt being adapted to be secured to an engine lug, and spaced resilient units disposed at opposite ends of said bushing and connecting said bolt portion and bushing, each of said units including an end plate rigidly engaged with an end of said bushing, a second end plate rigidly carried by said bolt portion, and a pad of resilient material disposed between and bonded to said end plates, and means for limiting the amplitude of resonant oscillatory vibrations between said bolt portion and bushing.

7. A resilient flexible engine mount adapted to be interposed between a lug of an engine and a frame upon which the engine is to be mounted to allow the engine slight universal motion in response to its impulses and motions and to eliminate transmission of shocks and vibratory reactions into said frame, said mount including an assembly bolt adapted to engage said lug, a pair of washers upon said bolt, sleeve-like spacer means holding said washers in spaced relation, a pair of resilient cushioning means carried by said washers and having an inner diameter sufficiently in excess of the overall diameter of said spacer and assembly bolt as will permit distortion of said rings, and frame coupling means secured to said cushioning means in spaced relation to said washers, spacer and assembly bolt, said frame coupling means comprising a member adapted to be secured to the frame, and a second pair of washers bonded to said cushioning rings and being removably keyed to said member.

8. A flexible engine mount adapted to be interposed between a lug of an engine and a frame upon which the engine is to be mounted to allow the engine slight universal motion in response to its impulses and motions and to eliminate transmission of shocks and vibratory reactions into said frame, said mount including an assembly bolt adapted to engage said lug and having a portion extending therefrom, a pair of axially spaced resilient rings mounted in concentric relation to said bolt portion and adapted to be stressed radially in shear and transversely in compression, bushing means surrounding said bolt portion radially spaced therefrom intermediate said resilient rings, said bushing being adapted to be secured to the frame, means for securing said resilient rings to said bolt portion and to said surrounding bushing whereby stresses normal to the axis of said bolt stress said resilient rings in shear and axial stresses in said bolt compressively stress one of said resilient rings.

9. In a flexible engine mount as set forth in claim 8, resilient means disposed radially between the bolt portion and bushing, said resilient means being adapted to cushion transmission of vibration between said bolt portion and said bushing when said resilient rings have been stressed in shear beyond a predetermined limit.

10. In a flexible engine mount as set forth in claim 8, resilient means comprising a cylinder of resilient material mounted on said bolt portion and housed within said bushing and radially spaced from the internal surface thereof, operative to absorb transmission of vibration between said bolt portion and said bushing when said resilient rings have been stressed in shear beyond a predetermined limit.

WILBUR E. STITZ.
DWIGHT C. KENNARD.